US008058059B2

(12) United States Patent  (10) Patent No.: US 8,058,059 B2
Daly  (45) Date of Patent: Nov. 15, 2011

(54) BIO-WALL

(76) Inventor: Lewis J. Daly, Fayetteville, NY (US)

( * ) Notice: Subject to any disclaimer, the term of this patent is extended or adjusted under 35 U.S.C. 154(b) by 325 days.

(21) Appl. No.: 12/401,924

(22) Filed: Mar. 11, 2009

(65) Prior Publication Data
US 2010/0233797 A1 Sep. 16, 2010

(51) Int. Cl.
C12M 1/14 (2006.01)
C12M 3/04 (2006.01)
(52) U.S. Cl. .................. 435/299.1; 435/294.1
(58) Field of Classification Search ........... 435/299.1
See application file for complete search history.

(56) References Cited

U.S. PATENT DOCUMENTS

| 1,848,576 | A | 3/1932 | Sandel |
|---|---|---|---|
| 2,217,345 | A | 10/1940 | McGraw |
| 2,259,626 | A | 10/1941 | Erikson |
| 2,385,077 | A | 9/1945 | Harker at al. |
| 3,123,455 | A | 3/1964 | Paasche |
| 3,841,566 | A | 10/1974 | Wilford |
| 3,880,061 | A | 4/1975 | Hensiek et al. |
| 3,936,281 | A | 2/1976 | Kurmeier |
| 4,096,066 | A | 6/1978 | Kearney |
| 4,283,999 | A | 8/1981 | Kearney |
| 4,290,348 | A | 9/1981 | Morgan et al. |
| 4,401,051 | A | 8/1983 | Gunther |
| 4,421,534 | A | 12/1983 | Walker |
| 4,475,447 | A | 10/1984 | Kock et al. |
| 4,484,513 | A | 11/1984 | Napadow |
| 4,608,064 | A | 8/1986 | Napadow |
| 4,734,111 | A | 3/1988 | Hoffmann et al. |
| 4,930,705 | A | 6/1990 | Broerman |
| 4,961,763 | A | 10/1990 | Thompson et al. |
| 5,057,428 | A | 10/1991 | Mizutani et al. |
| 5,089,036 | A | 2/1992 | Hawes |
| 5,309,581 | A | 5/1994 | Lockwood et al. |
| 5,407,470 | A | 4/1995 | Jutzi |
| 5,409,834 | A | 4/1995 | Birdwell |
| 5,609,753 | A | 3/1997 | Prazmowski |
| 5,691,192 | A | 11/1997 | Cox et al. |
| 5,741,178 | A | 4/1998 | Telchuk |
| 5,869,323 | A | 2/1999 | Horn |
| 6,010,900 | A | 1/2000 | Cherry |
| 6,027,566 | A | 2/2000 | Telchuk et al. |
| 6,171,853 | B1 | 1/2001 | Kim |
| 6,752,854 | B1 | 6/2004 | Varone et al. |
| 6,881,436 | B2 | 4/2005 | Yamane et al. |
| 6,924,140 | B2 | 8/2005 | Daly |
| 7,022,186 | B1 | 4/2006 | Wilson |
| 2002/0000191 | A1 | 1/2002 | Yamane |
| 2004/0152185 | A1* | 8/2004 | Egan et al. .................. 435/266 |
| 2006/0096918 | A1 | 5/2006 | Semmens |

OTHER PUBLICATIONS

Cha, KR2002073974 DERWENT ABS, Sep. 28, 2002.*

* cited by examiner

Primary Examiner — Michael Marcheschi
Assistant Examiner — Shanta G Doe
(74) Attorney, Agent, or Firm — Hiscock & Barclay LLP

(57) ABSTRACT

A bioremediation device in the form of a cylindrical cartridge having an open mesh side wall and end-caps forming an enclosed volume and which contains a suitable media. The cartridge is removeably mounted in and supported on opposite sides by wall halves in the form of near semi-circular housing halves. The wall halves further contain inlet and outlet openings to permit a liquid and gaseous flow through the cartridge and the contained media.

4 Claims, 17 Drawing Sheets

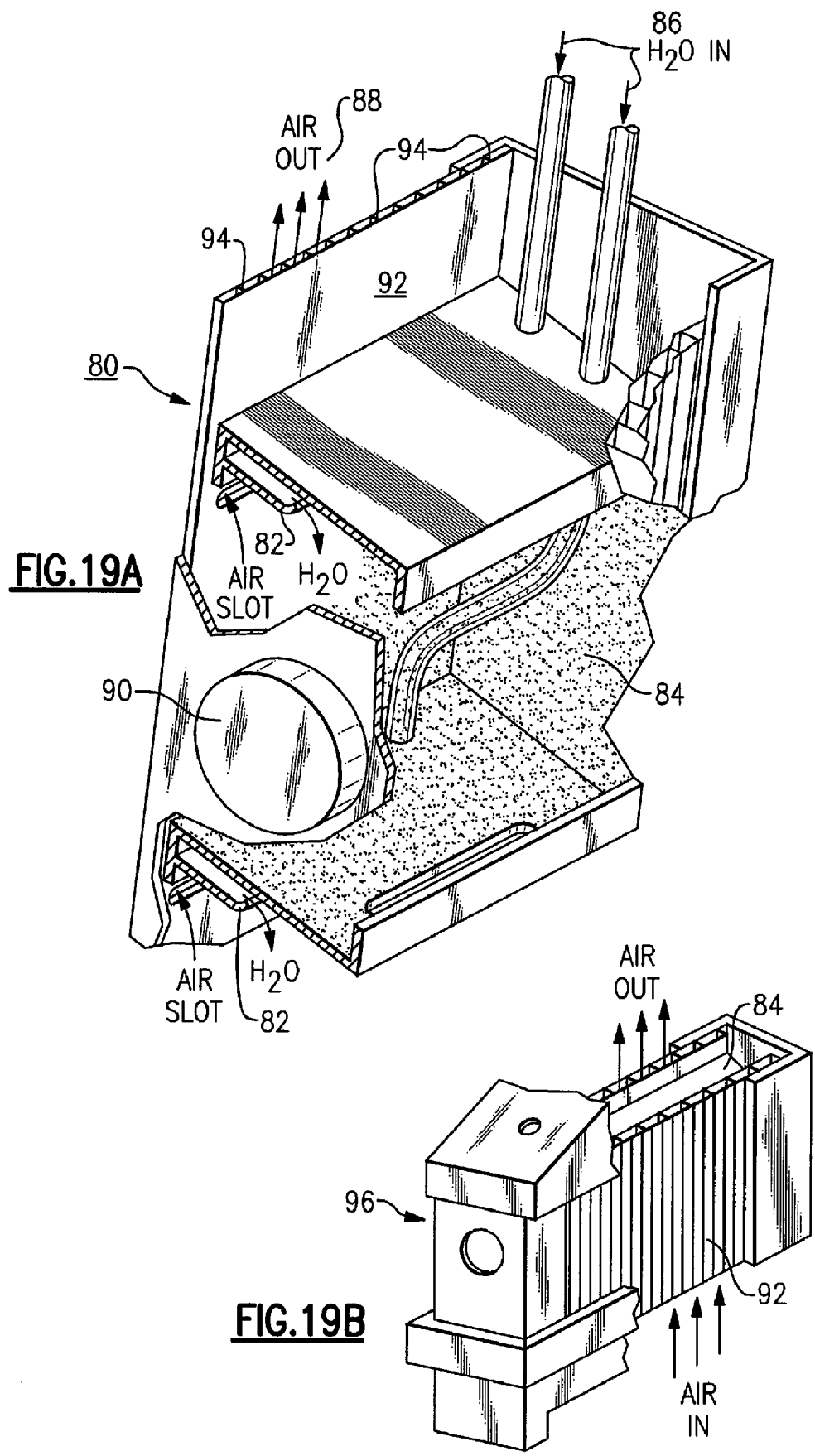

BIO-WALL

BACKGROUND OF THE INVENTION

The invention relates in general to a bioremediation system, and more specifically to a system which utilizes multiple horizontally oriented media filled cartridges which are stacked vertically one above the other in the form of a wall panel or placed horizontally side by side in the form of a ceiling or floor panel.

U.S. Pat. No. 6,924,140 utilizes cartridges having a solid wall outer shell to hold the media and includes top and bottom grilles to permit vertical airflow and liquid flow through the enclosed media. Multiple cartridges are inserted side by side into and between top and bottom structures that include provisions for the introduction and removal of air and liquid flow through the cartridges in a parallel method of operation.

In a contaminated airflow through a cartridge or bioreactor, remediation efficiency diminishes with increased distance traveled from inlet to exit. Also, microbial activity produces a biomass buildup which requires the media to be cleaned or replenished on a regular basis. It can therefore be seen that there is a need for an improved bioremediation system which overcomes the problems of the prior art described herein. Considering these factors it is beneficial to subdivide a biofiltration system into smaller cartridges having shorter airflow paths to improve performance.

SUMMARY OF THE INVENTION

It is therefore an object of the present invention to provide a bioremediation system which overcomes the problems of the prior art described above.

It is another object of the present invention to provide an efficient bioremediation system.

It is another object of the present invention to provide an improved bioremediation cartridge or cell.

It is another object of the present invention to provide a removable cartridge for a bioremediation system.

It is another object of the present invention to provide a cartridge that consists of a round, square or rectangular mesh sleeve with solid end caps.

It is another object of the present invention to provide improved bioremediation devices in the form of wall, ceiling, and floor panel members containing multiple, smaller cartridges or cells.

It is another object of the present invention to provide an economical multi-cell wall, ceiling, or floor panel.

It is another object of the present invention to provide cartridges or multi-cell panel configured into bays, and that can be easily removed, maintained and reused.

It is another object of the present invention to provide mobile bioremediation devices in the form of wall, ceiling or floor panels.

It is another object of the present invention to provide a means to position a bioremediation device as close to a contaminant release point as possible for maximum collection and removal efficiencies.

It is another object of the present invention to provide a means for constructing a total enclosure made up of bioremediating wall, floor, and ceiling panels to contain and internally remediate the enclosure volume.

It is another object of the present invention to provide an improved bioremediation device composed of multiple removable panels or bays configured in the form of a cube.

The invention is directed to a vertically oriented bioremediation wall panel system which utilizes multiple horizontally oriented media filled removable cartridges. The cartridges are preferably cylindrical in shape and consist of a cylindrical mesh sleeve with solid end caps, which may be stacked one above the other between two vertical enclosure wall halves that have incomplete almost semi-circular features to support each cartridge individually, and contain and direct air and liquid flow vertically through the bank of cartridges in the remaining inlet and outlet open areas formed by the discontinuous almost semi-circular features in the wall halves.

The cylinders contain a granular or pelletized carrier medium which in operation supports a liquid film suitable for holding microorganisms or a mix of microorganisms on the carrier surface which have been selected to degrade the styrene or other VOC's (volatile organic compounds) of interest. The cartridges are preferentially filled with a suitable inert carrier material such as perlite or an inert synthetic granular material such as plastic or a ceramic. A contaminated airstream and nutrientjzed water flow through the mesh wall of the cartridge promotes the growth of indigenous or synthesized microorganisms on the surface of the carrier material, which through the action of the microorganisms acts to biodegrade the HAP's (hazardous air pollutants) and/or VOC's of interest contained in the air stream. Suitable microorganisms which can be used to promote this degradation include bacteria, such as Pseudomonas and Mycobacterium. Other suitable natural occurring materials which contain indigenous microorganisms such as compost, peat, soil, wood chips, plant residues and tree bark may also be used or included.

The cartridges are designed to be inserted horizontally from the end of the wall into multiple matching semi-circular openings formed by the wall halves which support and seal off the mesh cartridges on each side while permitting vertical air flow through a central open area of the enclosed bank of cartridges. Multiple vertical enclosure assemblies may be fastened together to form a tall, wide wall which is thin in depth.

A further component of the system includes removable dividing shelf members which function to selectively contain and direct air and liquid flow to individual cartridges, and are inserted across the opening between each stacked cartridge and supported by the sidewall halves to form complete, discreet enclosures around each cartridge.

The system further includes a linear liquid distribution manifold extending the length of the cartridge and preferably mounted to the removable horizontal shelf member above the cartridge. Also included is a liquid collection manifold extending the length of the cartridge and preferably mounted to or formed by the removable horizontal shelf member below the cartridge.

The system further includes outer wall halves external to the semi-circular wall halves which are mounted to said wall halves so as to form wall chambers or air and liquid manifolds on each side and external to the cartridges and shelf members. The outer wall halves permit air and liquid to be contained and selectively directed into and out of openings in the semi-circular inner wall halves and into and out of the cartridges.

The system further includes the capability to periodically flush, saturated and re-inoculate the absorbent media from a water reservoir source containing the same microbes. The system further has the capability of operating with a continual water flow such as in a biotricklng mode, with a suitable high surface area non-absorbent media.

In a further embodiment, the invention includes a horizontally oriented bioremediation floor or ceiling panel system which utilizes multiple horizontally oriented media filled removable cartridges. The cartridges are preferably cylindrical in shape and consist of a cylindrical mesh sleeve with solid end caps, which may be stacked side by side between two horizontally oriented enclosure wall halves that include semi-circular features to support each cartridge individually and contain opposed inlet and outlet open areas in said semi-circular features to direct air and liquid flow vertically through each cartridge.

The cartridges are designed to be inserted horizontally from the end of the panel into the multiple matching almost semi-circular openings formed by the inner wall halves which support and seal off the mesh cartridges on top and bottom while permitting horizontal air flow through the central open area between the enclosed cartridges.

Vertical airflow can selectively be introduced to each cartridge by means of openings in the upper and lower opposed inner wall halves such that the flow is vertical through the cartridge. A vertically downward liquid flow can be introduced to each cartridge by means of openings in the upper and lower opposed inner wall halves. Multiple horizontal enclosure assemblies may be fastened together to form a wide floor or ceiling section which is low in height.

A further feature of the system includes removable vertical partitioning members to selectively contain and direct air and liquid flow to individual cartridges, and are inserted across the opening between each cartridge and supported by the top and bottom wall halves to form complete, discreet enclosures around each cartridge. The system also includes a linear liquid distribution manifold extending the length of the cartridge and preferably mounted to the upper wall half on top of the cartridges.

A further feature of the system includes a linear liquid collection manifold extending the length of the cartridge and preferably mounted to the lower wall half under the cartridges.

The system further includes outer panels external to the semi-circular wall halves which are mounted to said wall halves so as to form external air and liquid manifolds above and below the cartridges and inner wall halves. The external outer ceiling and floor halves permit air and liquid to be contained and selectively directed into and out of openings in the semicircular inner wall halves and into and out of the cartridges.

Both the air and liquid flow through the multiple bank of cartridges used as a wall, floor, ceiling or other configuration can selectively and individually be in series, parallel, or in combination when configured with multiple cartridges. All cartridges can draw air from a common source and release to second air point, and draw and return liquid to a common source.

A distinct advantage of this system is in the distance of the airflow path through the media. It has been established that the greatest remediation occurs at the air entry point and diminishes with increased distance from the inlet to the exit point of the cartridge. The design employed in the present invention creates a short transverse distance between the entry and exit points due to the air flowing across the diameter of the horizontally oriented cylindrical cartridge, as opposed to flowing along the entire length of the cartridge.

Another advantage of the cylindrical mesh cartridge is the ability to periodically rotate the cartridge in the housing and thereby redistribute the media. Biological activity causes a biomass buildup over time that would be flushed towards and through the mesh to the water outlet side, and this would be scraped off the mesh by the housings walls when the cartridge is rotated, thereby efficiently and effectively cleaning the cartridge.

A further advantage for a round, square or rectangular cartridges inserted from the end into airflow containment features found in the inner housing halves of a panel is the ability to remove and remotely redistribute and clean the biomass within the cartridge external to the housing at a remote location.

By including a second set of enclosing wall halves external to and on both sides of the cartridge supporting enclosure halves, separate manifold passages are created on each side of the inner enclosure assembly. These passages function to contain and direct both the air and liquid flows in and out of openings in the inner walls and thus into and out of the cartridges. A horizontal, linear, full cartridge length liquid manifold is employed above each cartridge which functions to individually and evenly introduce the liquid to each cartridge. By utilizing a lower horizontal, linear, full cartridge length liquid pickup shelf below each cartridge, it is also possible to individually drain out the liquid and biomass flushed through each cartridge.

Another embodiment of the invention includes a device having a pair of hollow wall outer housings which define an enclosed internal chamber containing a suitable media, with the space within said hollow wall housing configured to form a flow path for liquid and/or gas through a series of inlet and outlet passages which function to permit the liquid and/or gas to flow through the internal chamber or cell and media contained therein. The device further includes an air moving means to cause a gaseous flow through said device. The device may also include a reservoir and pumping means to transfer liquid from the reservoir to a water distribution manifold through the media and air flow path. In this embodiment the device may be rectangular in shape and contain a pair of oppositely disposed hollow wall housing panels, to be subdivided into multiple cells formed between upper and lower horizontal shelves. The panels may comprise a plurality of evenly spaced vertically disposed microchannels which function to form the flow path.

This embodiment follows all the principal operating features of the circular cartridge embodiment described herein. The rectangular configuration offers a greater volume of media within a given overall enclosure volume, and is more cost effective in both construction and operation. The individual cartridge removal and cleaning by rotation is replaced by performing the same operations on the entire bay through individual access ports for each cell within the bay.

The system of the present invention can be deployed as multiple freestanding wall panel sections connected end to end to form a room enclosure, or lined up and fastened to existing walls as overlay paneling. A typical size for an individual wall section would be on the order of 4' wide by 8' tall and 8" thick, thereby using a minimum of the available floor space in a building being remediated As described above, the system of the present invention can also be deployed as multiple floor or ceiling panels to form complete room enclosures, or lined up and fastened to existing floors or ceilings.

The system of the present invention can also be deployed as multiple sections of either the vertical or horizontal panels as defined by the present invention and assembled front to back to create a larger module having a cubic form factor on the order of 4' by 8' by multiples of 8". The system can also optionally be constructed using four sided instead of round cartridges and thereby maximize the volume of media contained within the cartridges and associated system.

BRIEF DESCRIPTION OF THE DRAWINGS

For a further understanding of these and objects of the invention, reference will be made to the following detailed description of the invention which is to be read in connection with the accompanying drawings, where:

FIG. 5A is a partial perspective view of a liquid shelf shown in FIG. 5.

FIG. 19A is a detailed partial perspective view illustrating the air and water flow components for a cartridge of the type illustrated in FIGS. 18A and 18B.

FIG. 19B is a partial perspective view of the top cap reservoir and housing for the hollow wall housing of FIG. 19A.

DETAILED DESCRIPTION OF THE INVENTION

Figure 1:
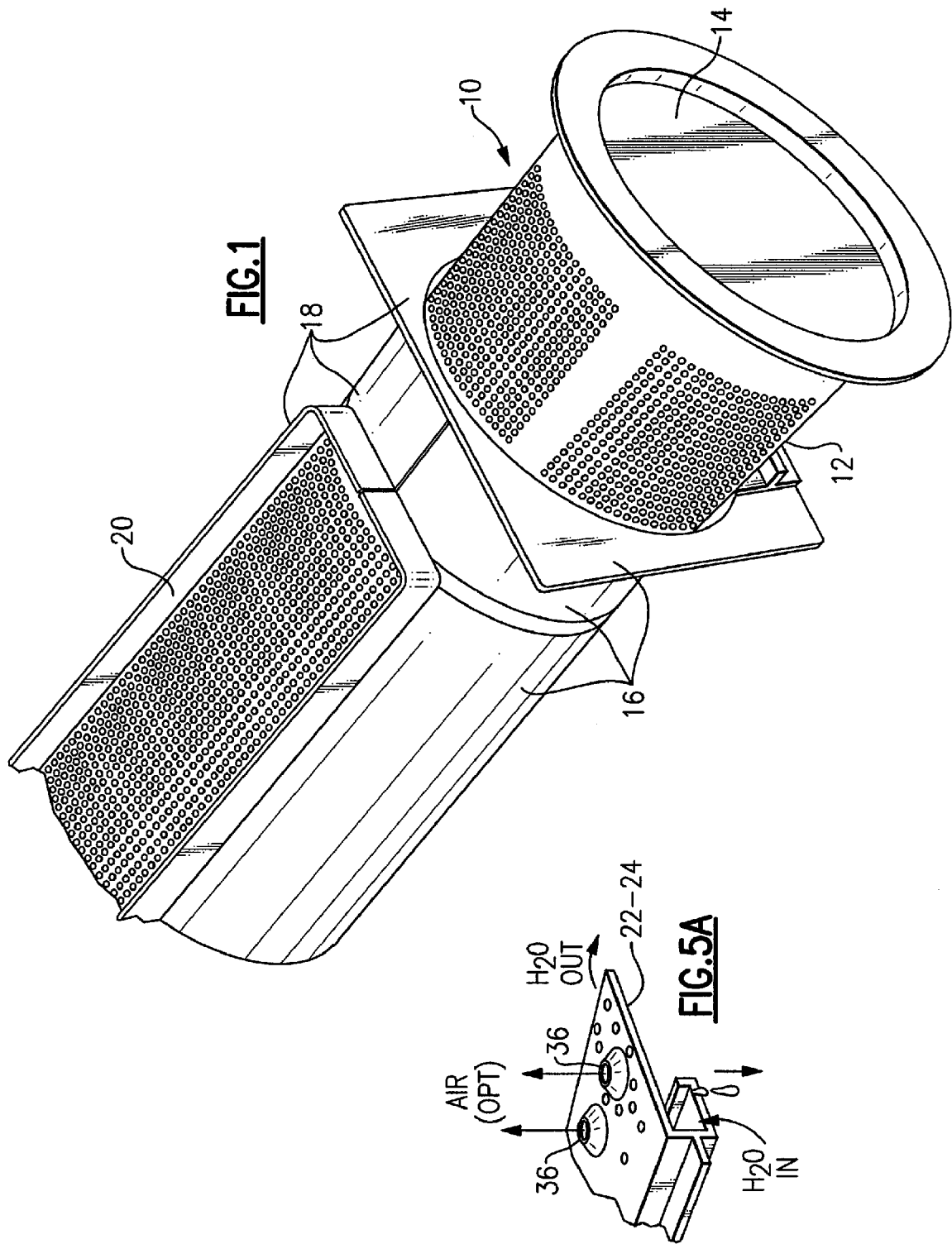
FIG. 1 is a perspective view of a cylindrical mesh cartridge and watering shelf contained in a support housing.
Figure 2:
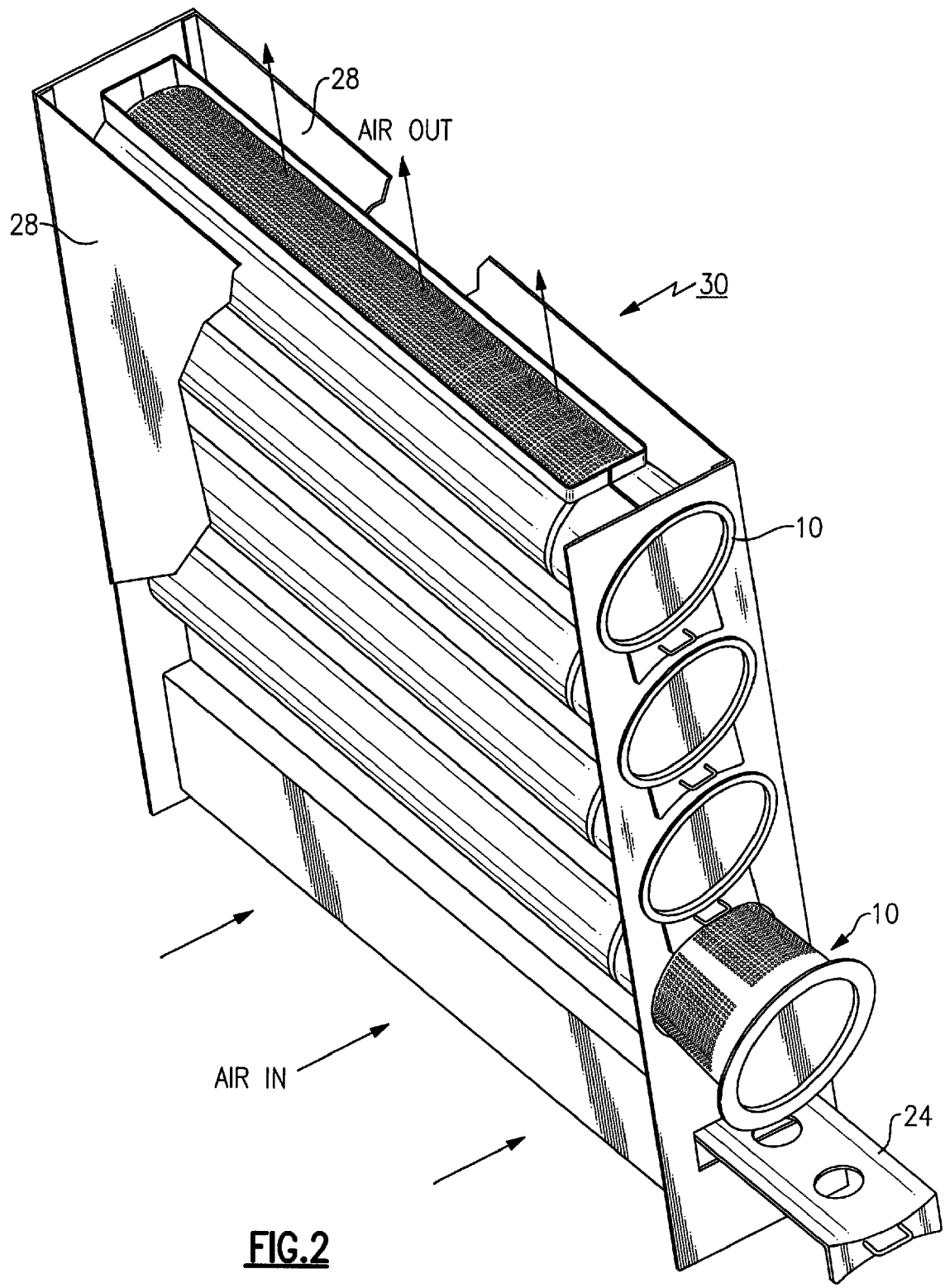
FIG. 2 is a perspective view of one embodiment of a bio-wall of the present invention.
Figure 3:
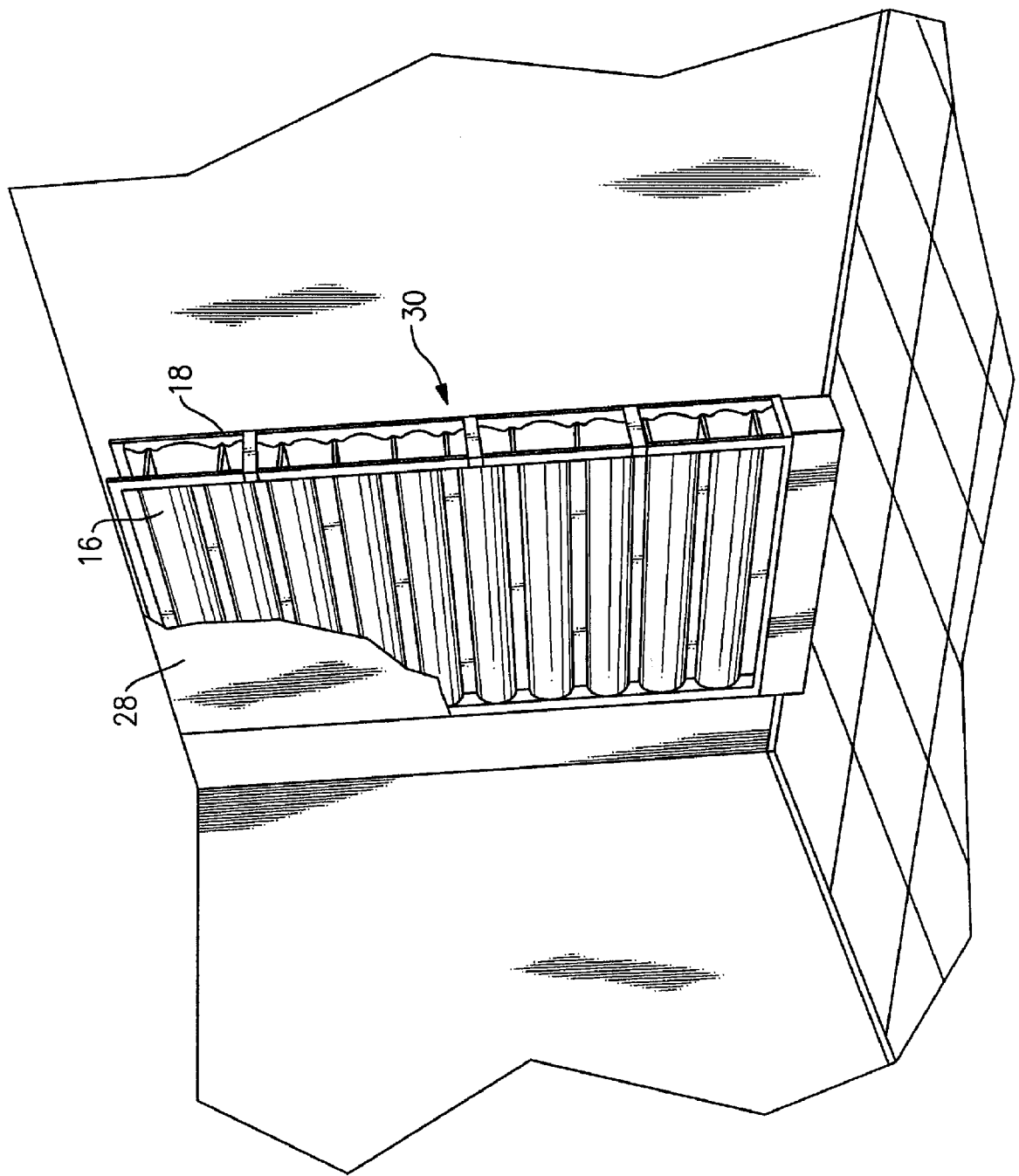
FIG. 3 is a perspective view of a bio-wall of the present invention positioned in a room.

The present invention is more fully understood with reference to the drawings wherein FIG. 1 a removable cartridge 10 is shown in perspective and partially inserted in a two piece inner housing half 16 and 18. The removable cartridge is a mesh sleeve 12 with solid end caps 14 and when used the cartridges are stacked vertically one above the other between the two vertical enclosure wall halves as will be more fully described herein. The inner housing halves are contained within (an) outer wall members 28 which together define the bio-wall 30 of the present invention (See FIG. 2). The housing halves further define an upper and lower longitudinal opening 20 to support upper and lower liquid shelves (or dividers) 22 and 24, respectively which will also be described in greater detail herein. The bank of cartridges are shown in FIG. 2 with the airflow being indicated by the arrows. In FIG. 2 outerwall 28 seals the bank of cartridges supported within the inner wall and form air and water passages (housing) halves. FIG. 3 illustrates a complete wall 30 formed by multiple stacked inner housing halves enclosed by outerwall 28 in place in the corner of a room.

Figure 4:
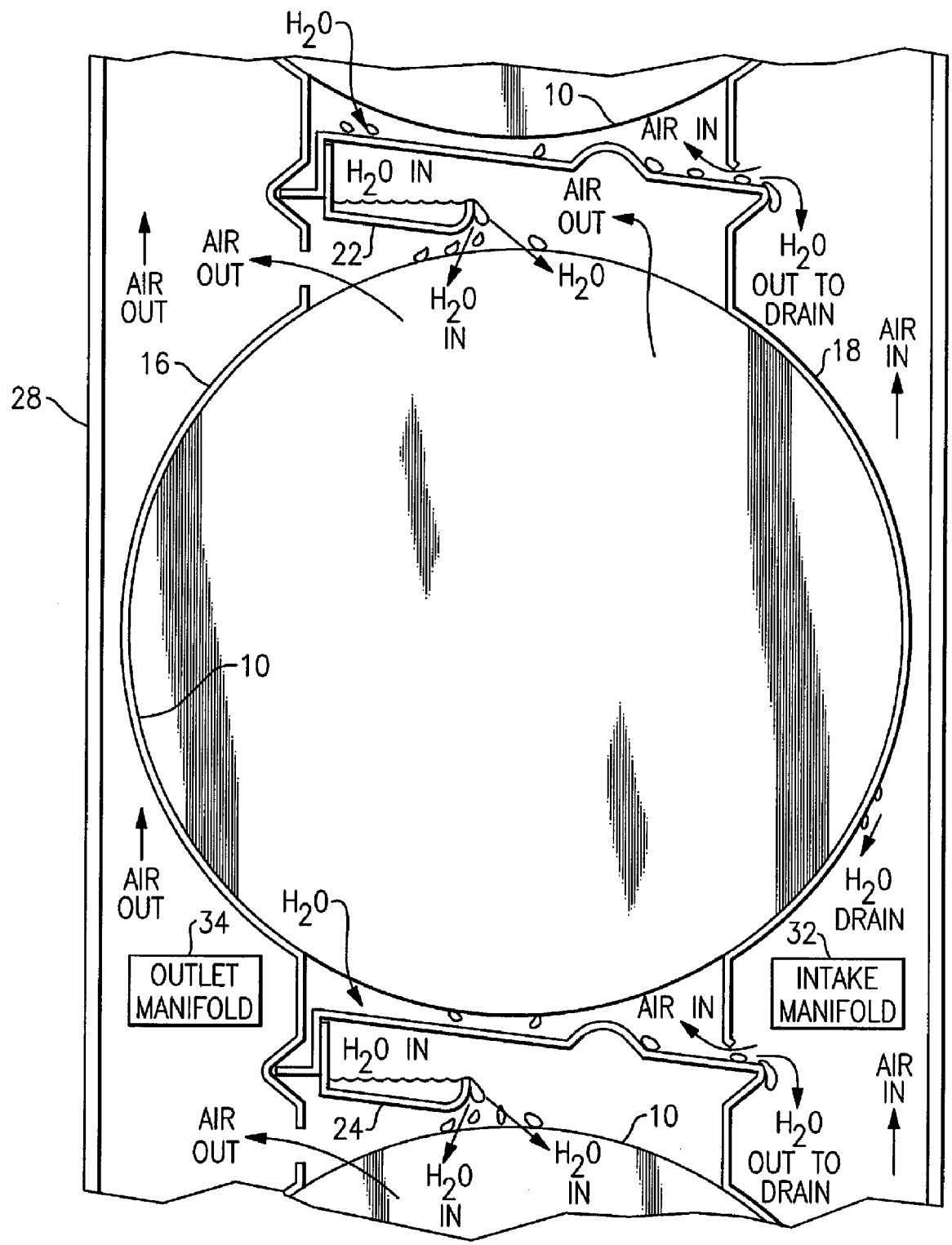
FIG. 4 is a sectional end view of a cartridge and support housing illustrating parallel flow for air and liquid.

FIG. 4 illustrates one embodiment of the present invention in which the system is operated in a parallel mode with the airflow as illustrated on the right hand side and flow through an intake manifold 32 and through a slot in the semicircular side wall at the bottom right hand side into the mesh side wall of the given cartridge and out the left hand side at the top left hand corner of the drawing through outlet manifold 34. The liquid shelves 22 and 24 both above and below the cartridge contain and limit airflow to the one cartridge and control the flow of liquid through and out of the cartridge with the top liquid shelf functioning to provide liquid to the cartridge from above which flows through the cartridge and out through the cartridge and to the bottom liquid shelf to a drain.

Figure 5:
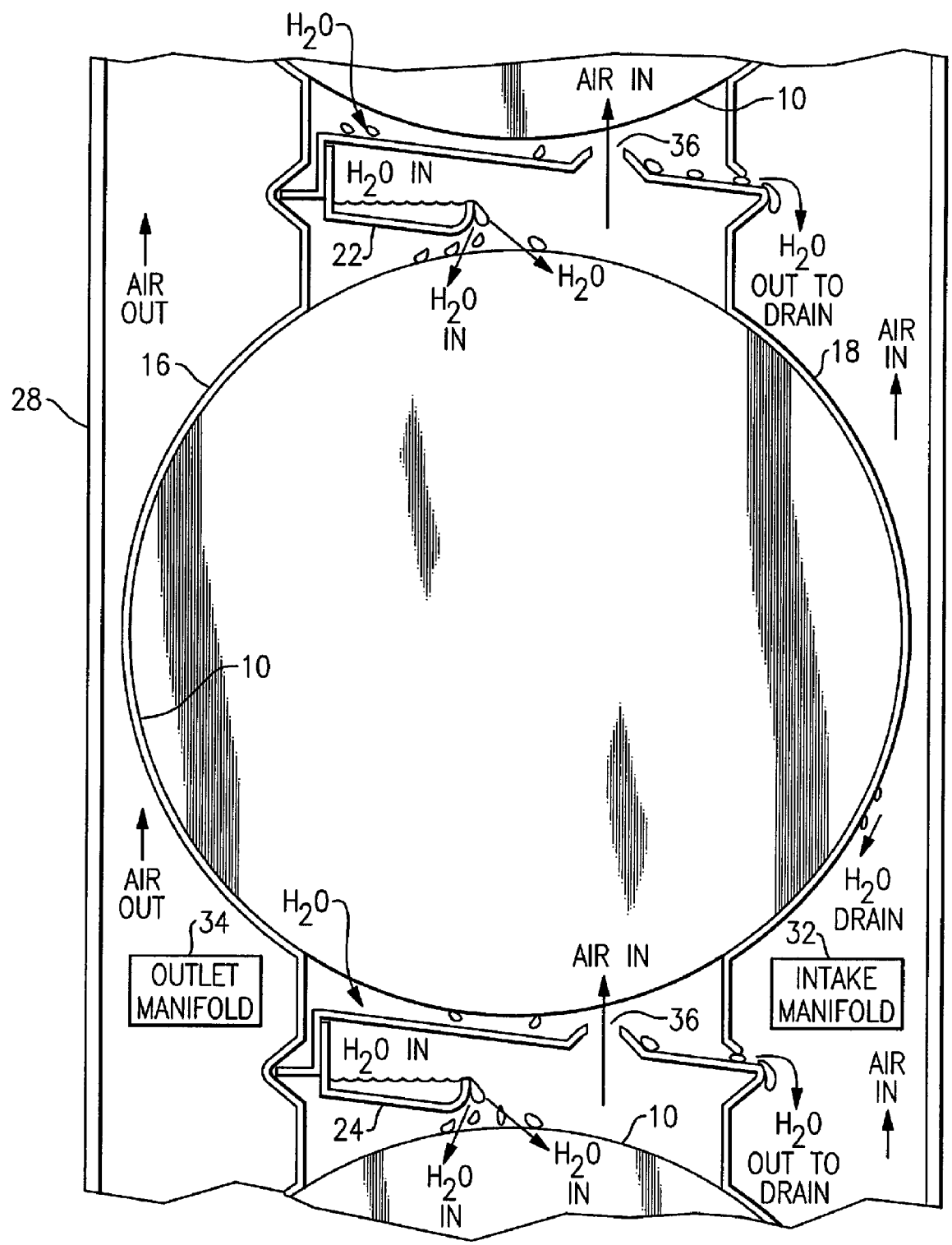
FIG. 5 is a sectional end view of a cartridge and support housing illustrating series flow for air and liquid.

FIG. 5 is an alternative embodiment similar to the structure illustrated in FIG. 4 which illustrates a series operation in which the airflow is from one cartridge to the next in at the bottom and out through the top openings 36 in the liquid shelf. FIG. 5A is a perspective view of the liquid shelf illustrating the air opening 36 in the liquid shelf. The liquid flow is similar to that shown in FIG. 4.

Figure 6:
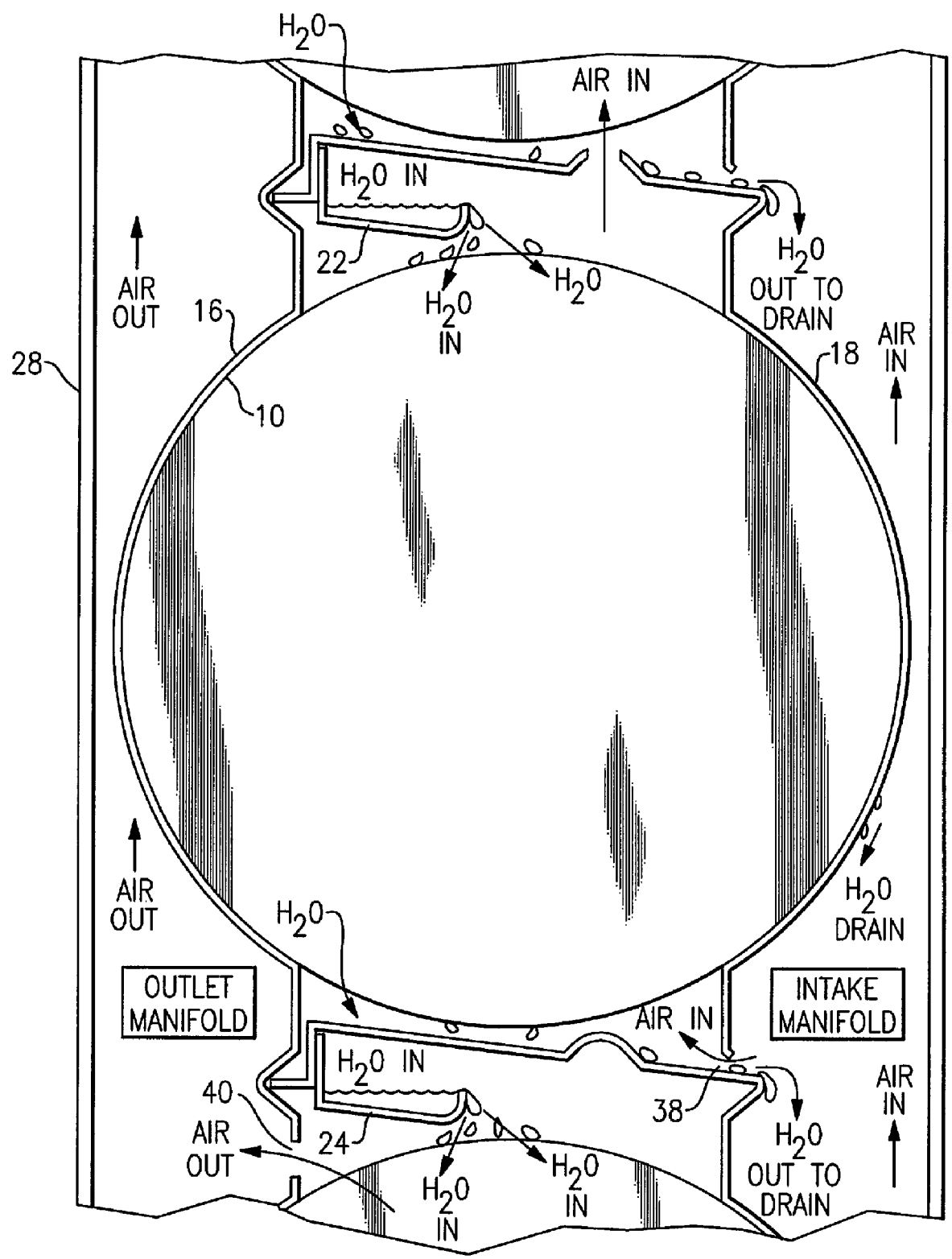
FIG. 6 is a sectional end view of a cartridge and support housing illustrating combined series/parallel flow for air and liquid.

FIG. 6 illustrates a structure similar to FIGS. 4 and 5 in which a combined series/parallel system is used in which the manifolds are designed to allow air to flow both through the cartridge through inlet opening 38 and to the above cartridge in series, and also out on the left hand side of the inner housing at 40, exiting from the top of a lower second pair of cartridges operating in series.

Figure 7:
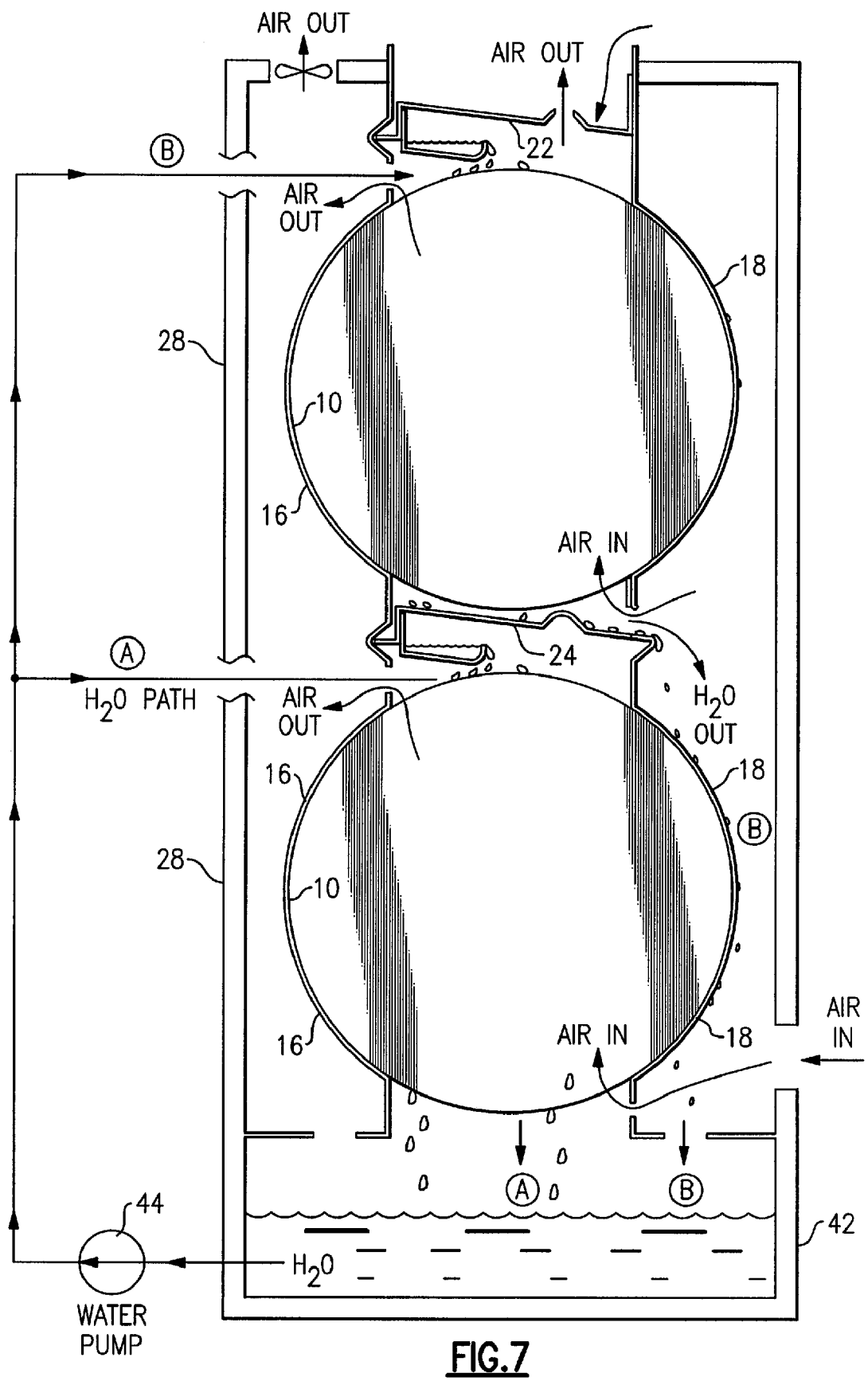
FIG. 7 is a sectional end view of a pair of cartridges and support housings illustrating alternative air and liquid flow paths through the system.

FIG. 7 illustrates a structure similar to FIGS. 4-6 in which a liquid reservoir 42 is employed and in which various airflow paths can be optionally utilized. Through the use of pump 44, liquid is recirculated from a bottom reservoir 42 to water distribution means under each shelf.

Figure 10:
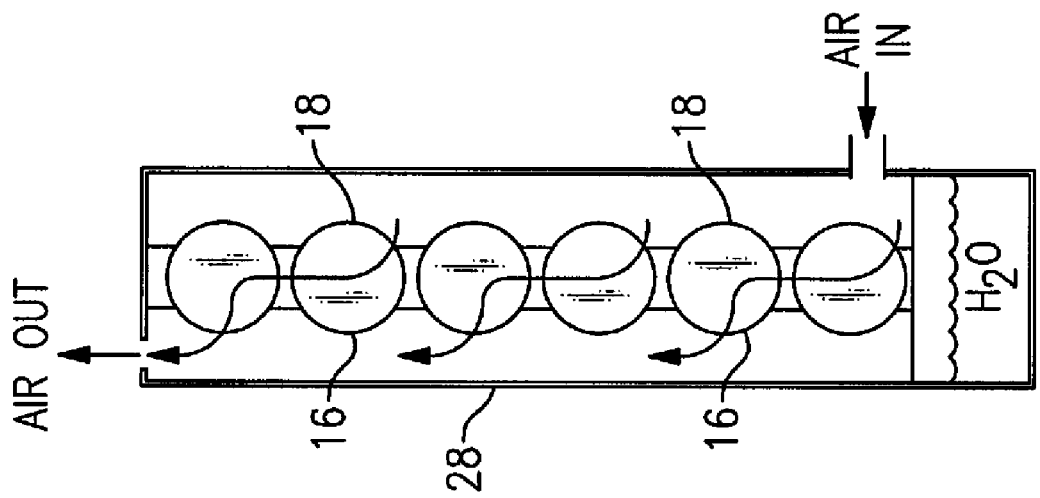
FIGS. 8-10 are schematic end views of optional air flow paths through the bio-wall.
Figure 9:
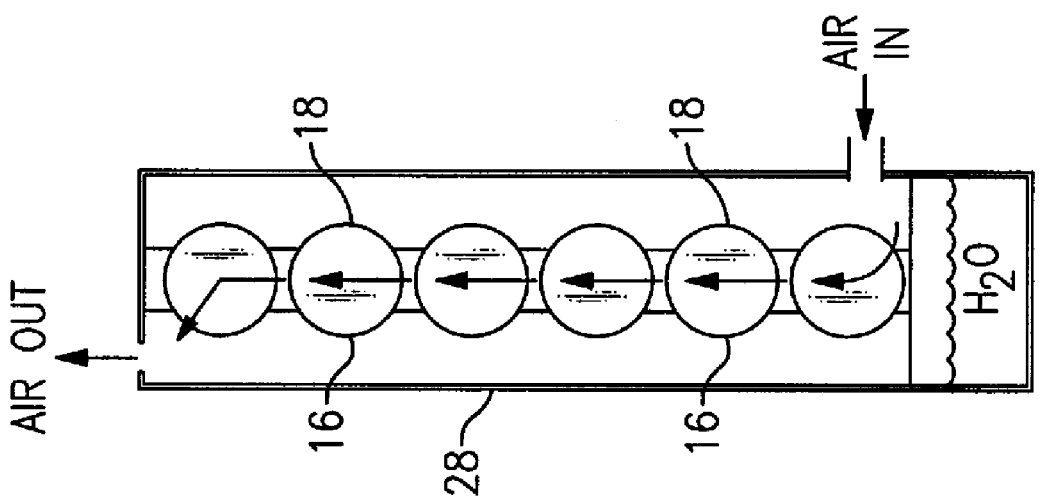
Figure 8:
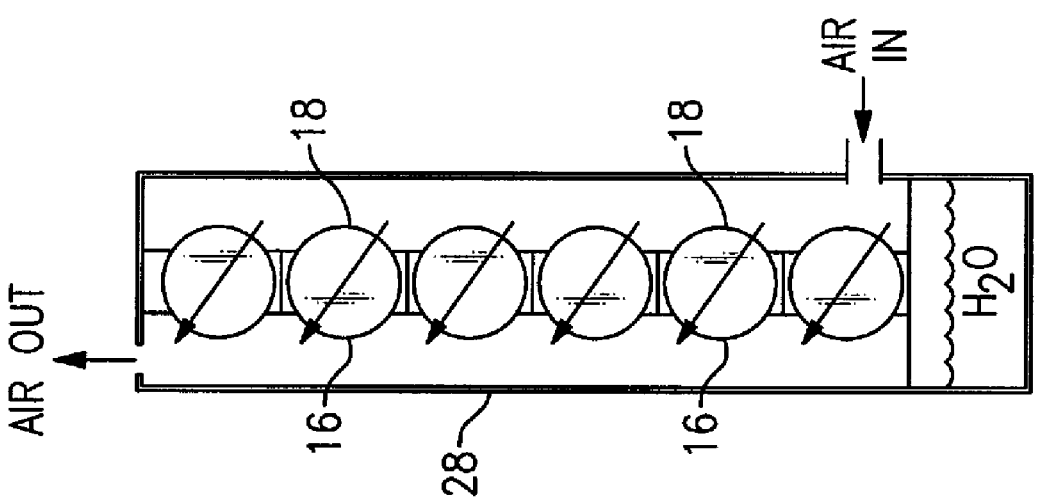

FIGS. 8, 9 and 10, respectively schematically illustrate parallel, series and combination airflow through the stacked cylinders.

Figure 11:
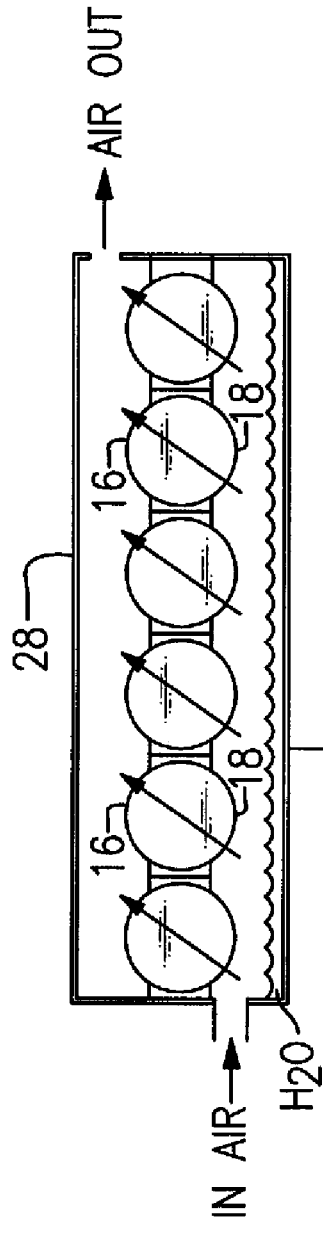
FIGS. 11-13 are schematic end views of optional air flow paths for the floor or ceiling panel embodiment.
Figure 12:
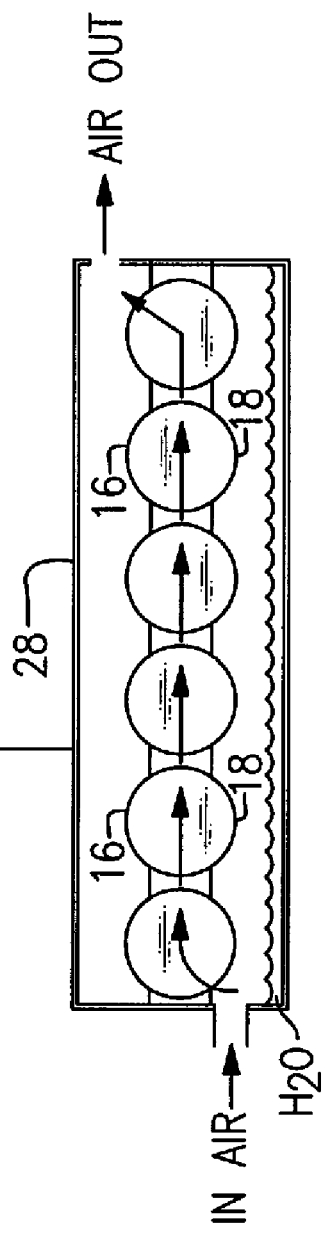
Figure 13:
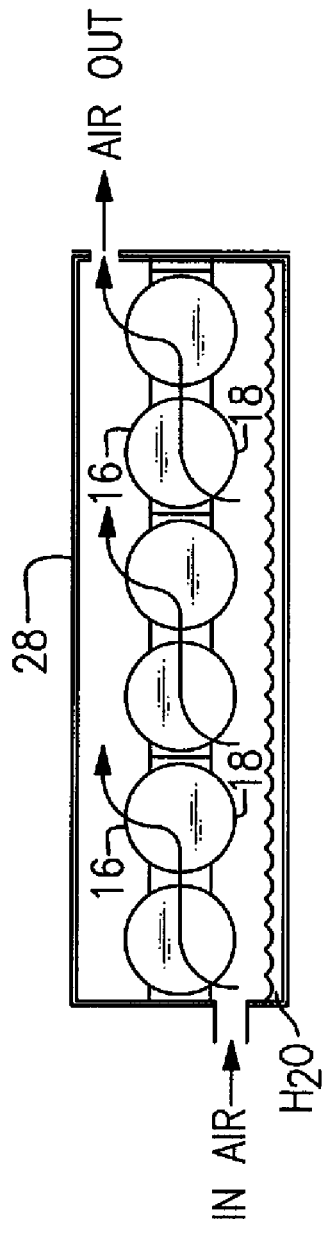

FIGS. 11-13, respectively schematically illustrate parallel, series and combination air flow through the cylinders which are arranged in a horizontal manner suitable for floor or ceiling mounting.

Figure 14:
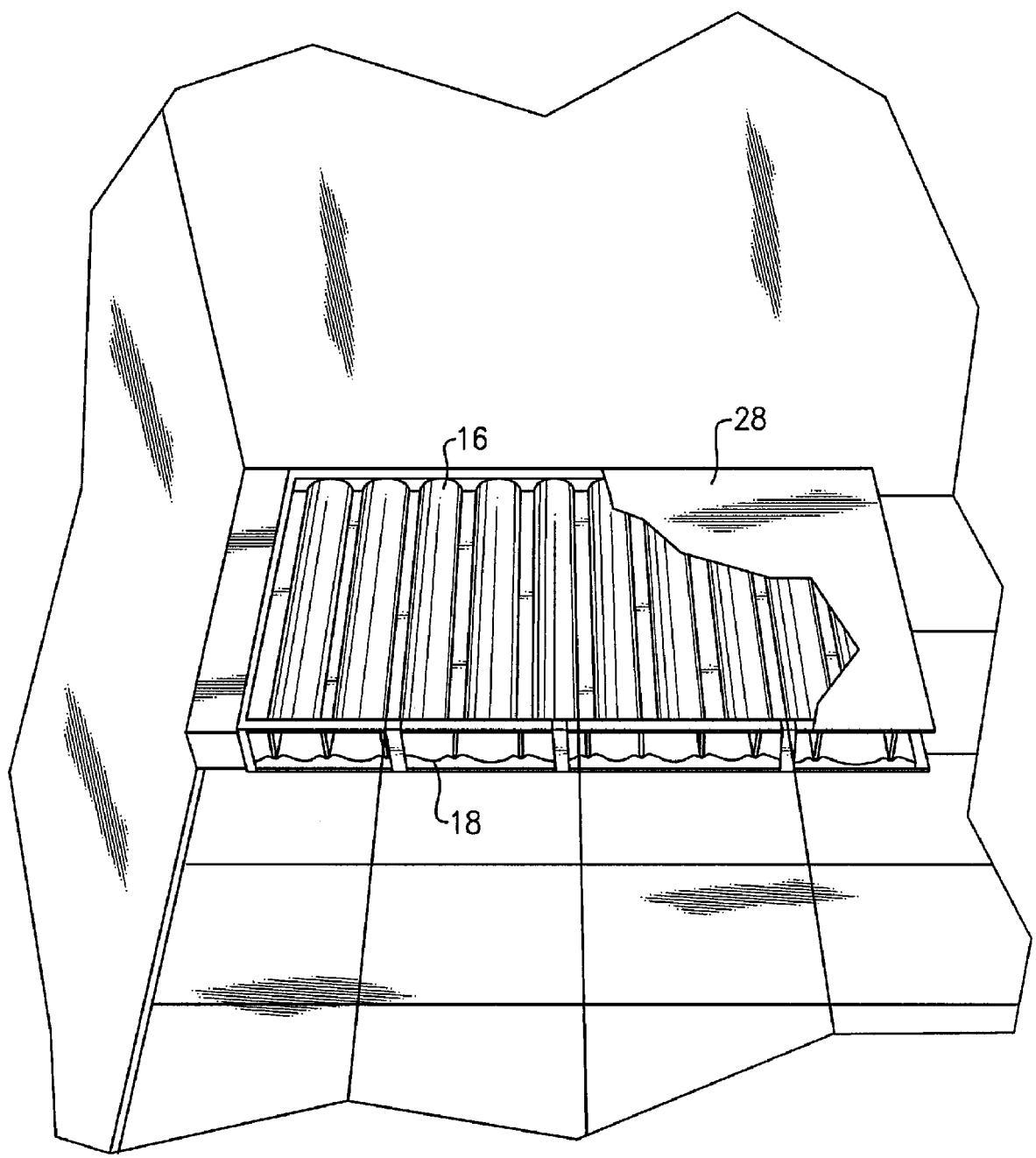
FIG. 14 is a perspective view of a floor panel of the present invention positioned in a room.

FIG. 14 illustrates a complete floor panel in place on the floor in a room.

Figure 15:
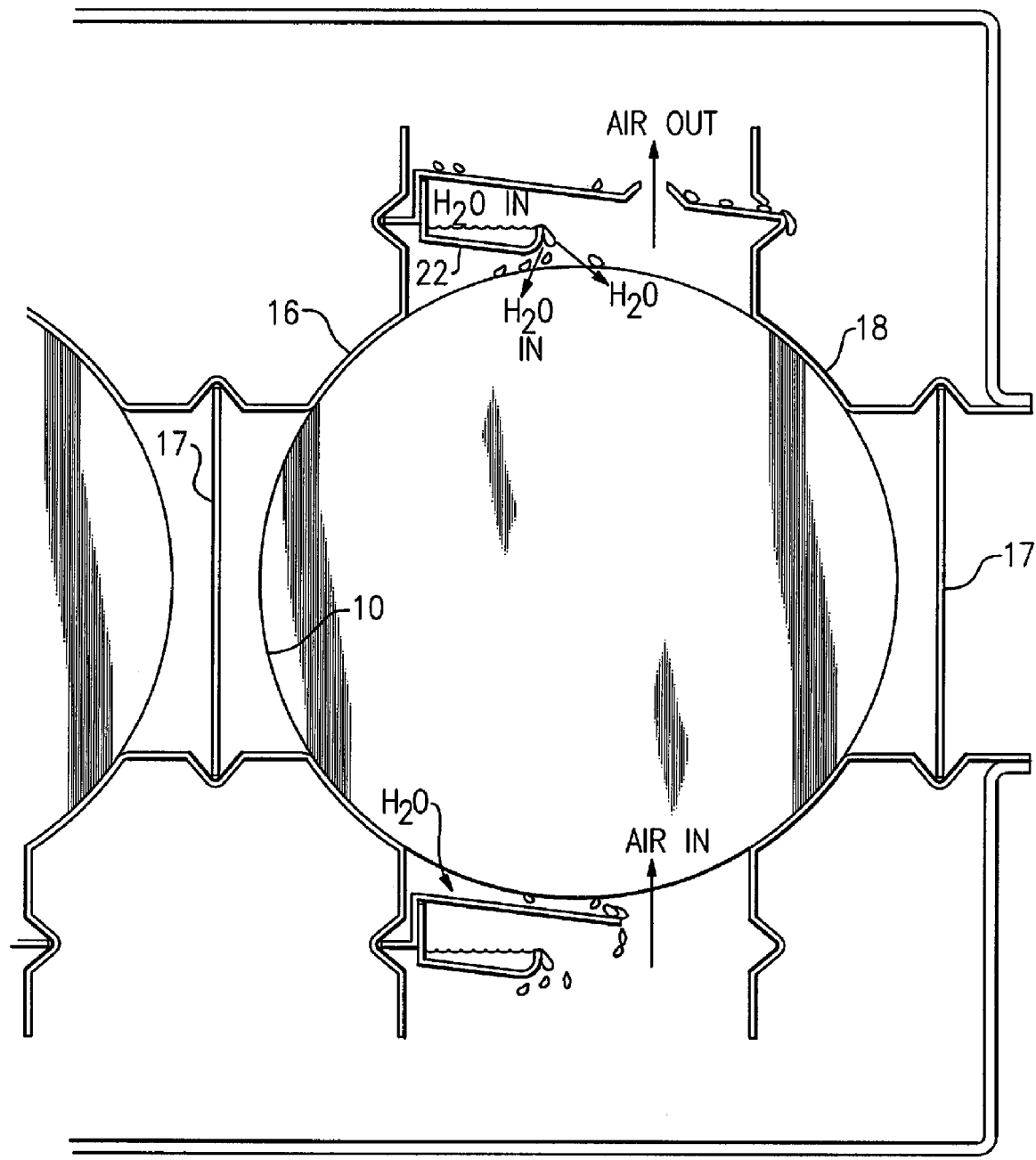
FIG. 15 is a sectional end view of a cartridge(s) horizontally positioned for use as a floor or ceiling panel.

FIG. 15 illustrates partial section end view of a cartridge connected in a horizontal manner illustrating the water shelf structure 22 and dividing wall 17 and air flow path through the system.

Figure 16:
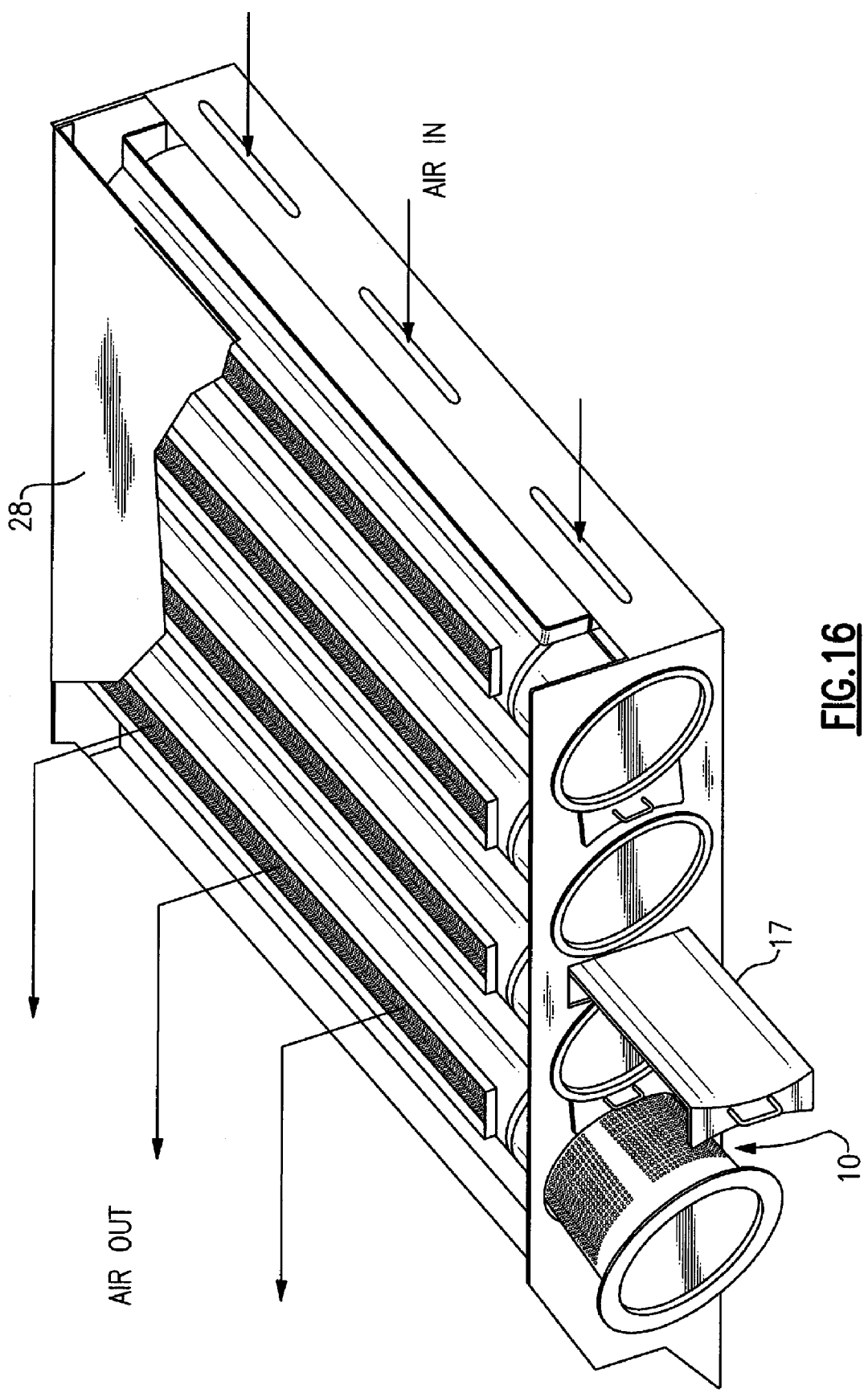
FIG. 16 is a perspective view of panel section in a horizontal mode illustrating air flow.

FIG. 16 illustrates a bank of cartridges with a dividing wall 17 and a cartridge partially pulled out and the air flow illustrated by the arrows in the drawing.

Figure 17:
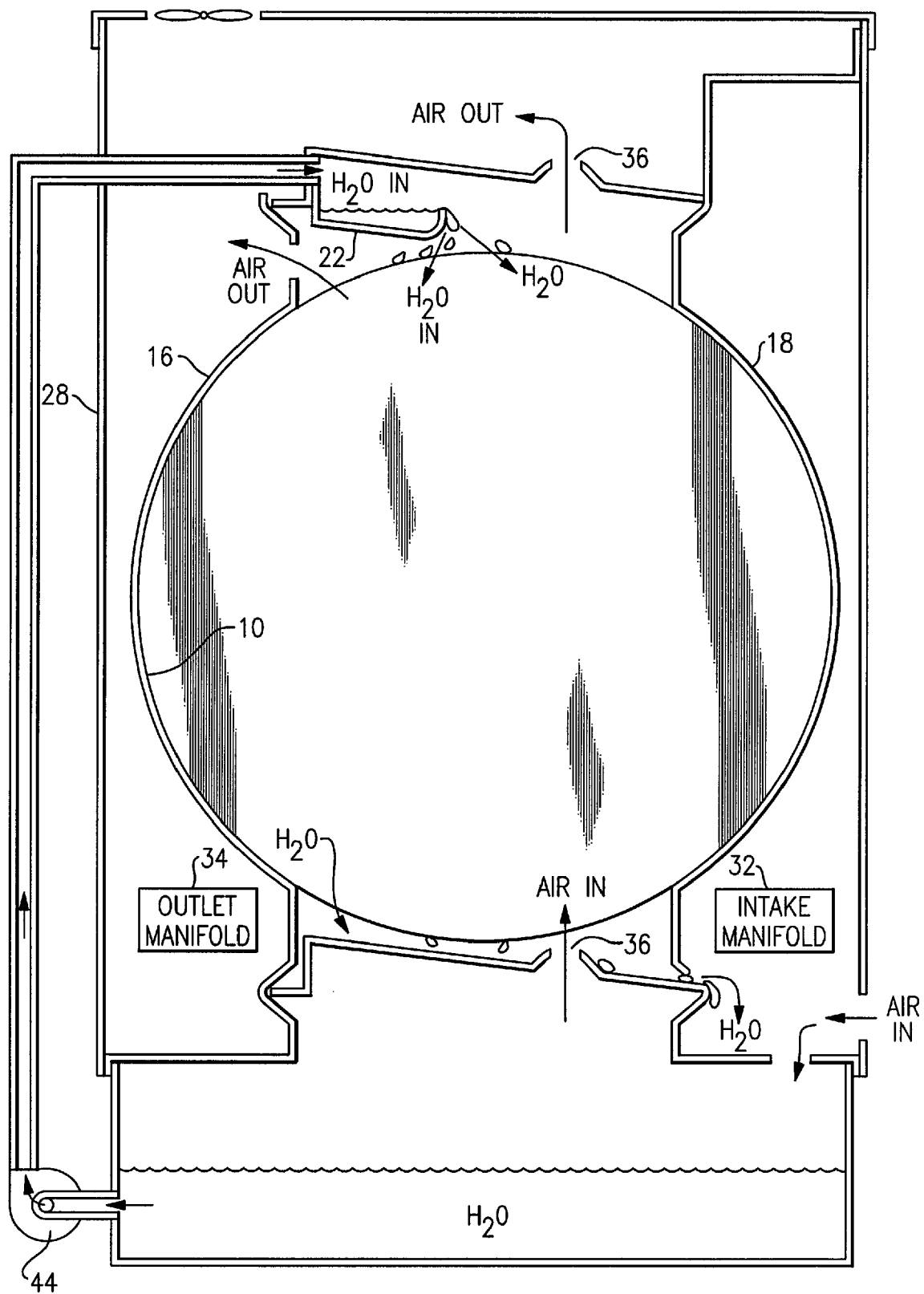
FIG. 17 is a sectional end view and support housing illustrating air and water flow paths.

FIG. 17 illustrates an end sectional view in series operation illustrating the intake and outlet manifold 32 and 34, water flow and reservoir and water pumping means 44 for a single cartridge.

Figure 18A:
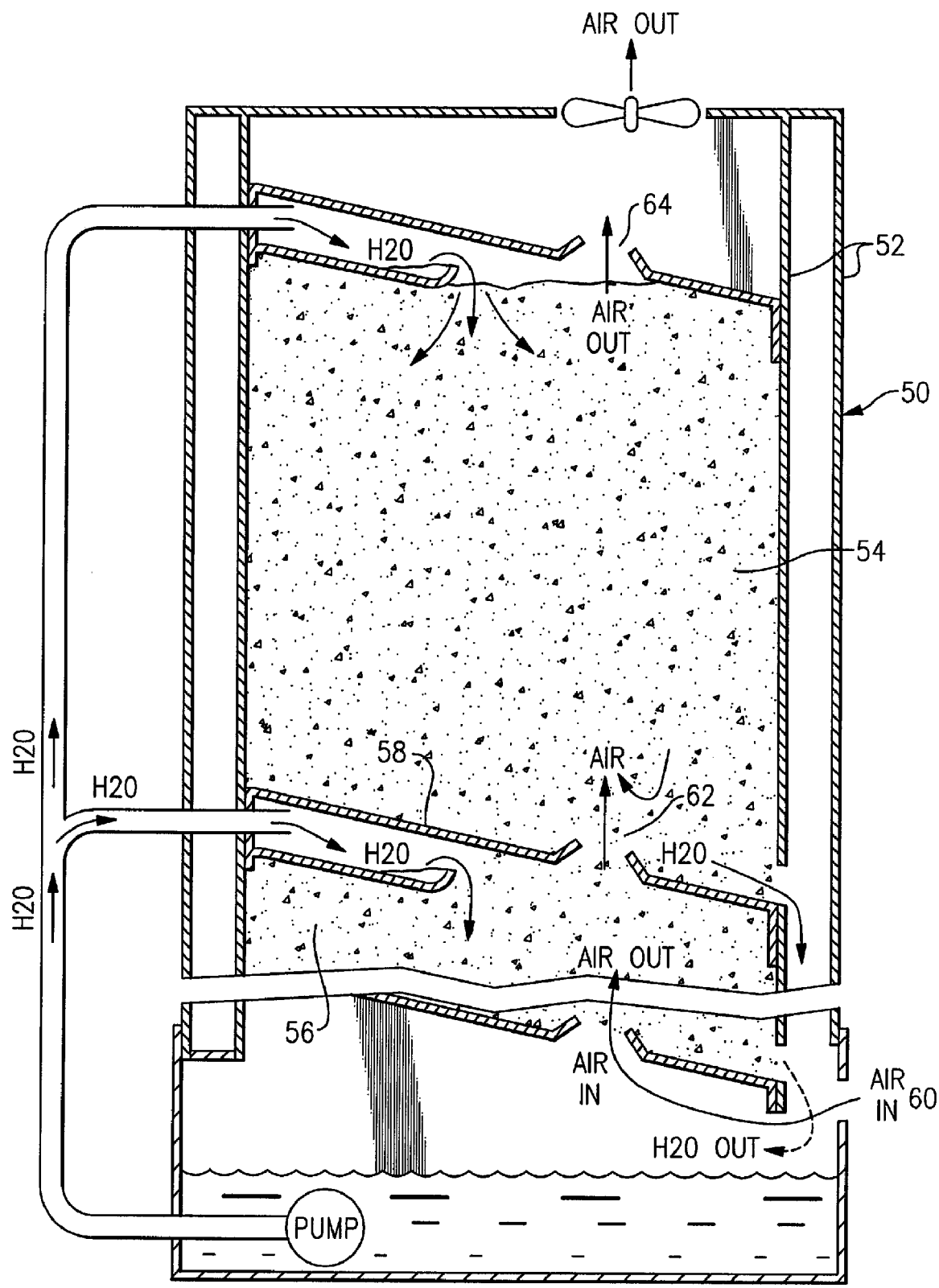
FIG. 18A is a sectional end view of a rectangular cartridge bay illustrating the use of hollow wall outer housings with two media cells and series flow.

FIG. 18A illustrates a further embodiment of the invention in which a housing 50 having a hollow wall 52 and which defines an enclosed internal chamber for the media is configured to form a flow path for the liquid and/or gas through a series of inlet and outlet passages 60, 62 and 64, respectively, which function to permit the liquid and gas to flow through the hollow wall 52 into the internal chamber and the media contained therein. The media bay shown has two media chambers 54 and 56 formed by divider plate 58 with series flow. In this embodiment the structure is essentially rectangular in form.

Figure 18B:
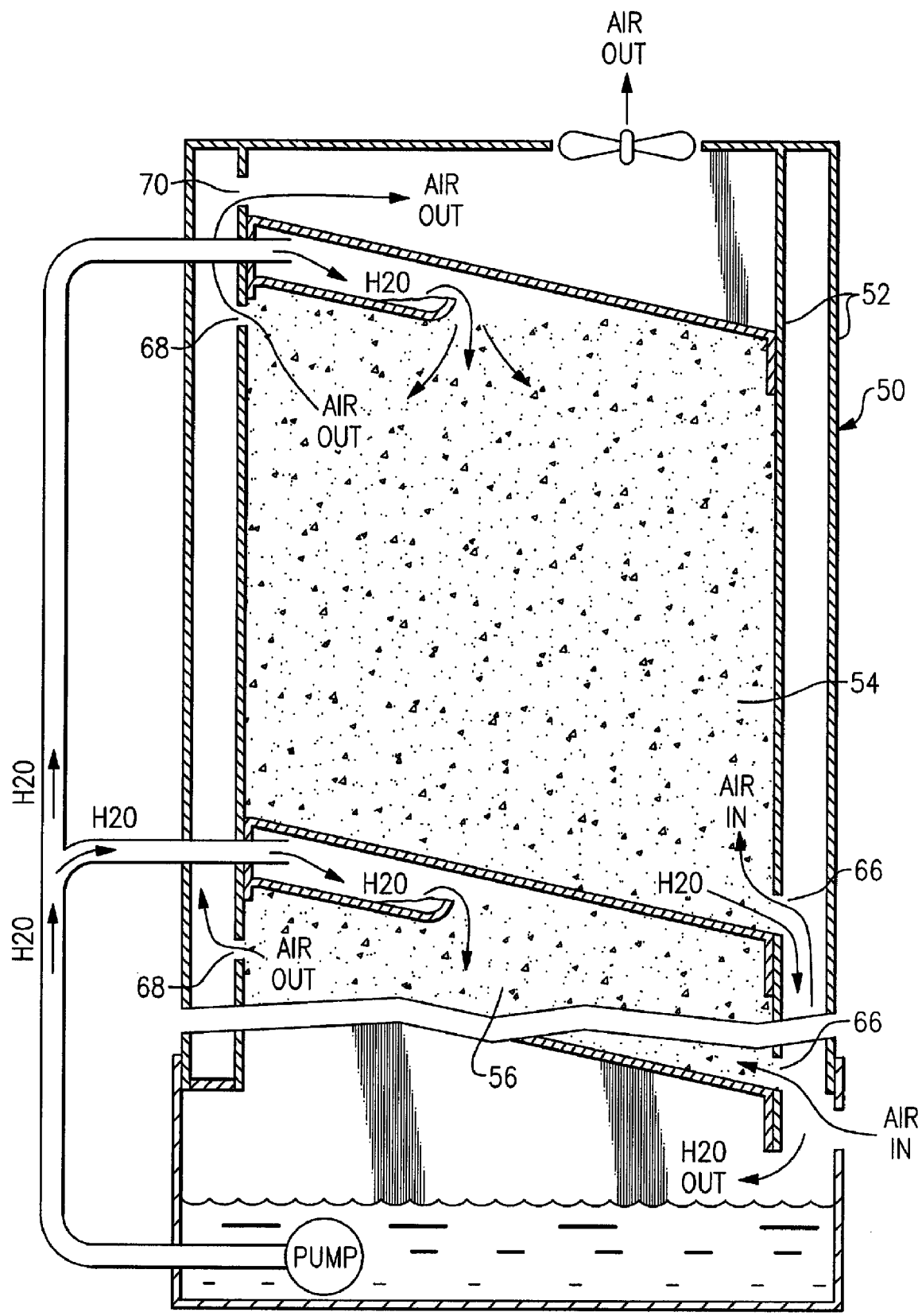
FIG. 18B is a sectional end view of a rectangular cartridge bay illustrating the use of hollow wall outer housings with two media cells and parallel flow.

FIG. 18B illustrates a structure similar to that shown in 18A except that the positioning of inlet and outlets 66, 68 and 70 provide for parallel flow.

FIG. 19A illustrates an additional embodiment of the invention and is a breakaway perspective sectional view of a portion of the hollow wall cell structure 80, water tray 82, and internal media cavity 84 illustrating the flow path for water 86 and air 88. A media fill opening and closure cap 90 are provided for easy access to the media chamber. The hollow wall 92 contains a plurality of microchannels 94 which provide for air or gas passage FIG. 19B shows an end cap structure 96 which functions to hold the hollow walls 92 in place to form an internal chamber 84 which holds the media.

Figure 20:
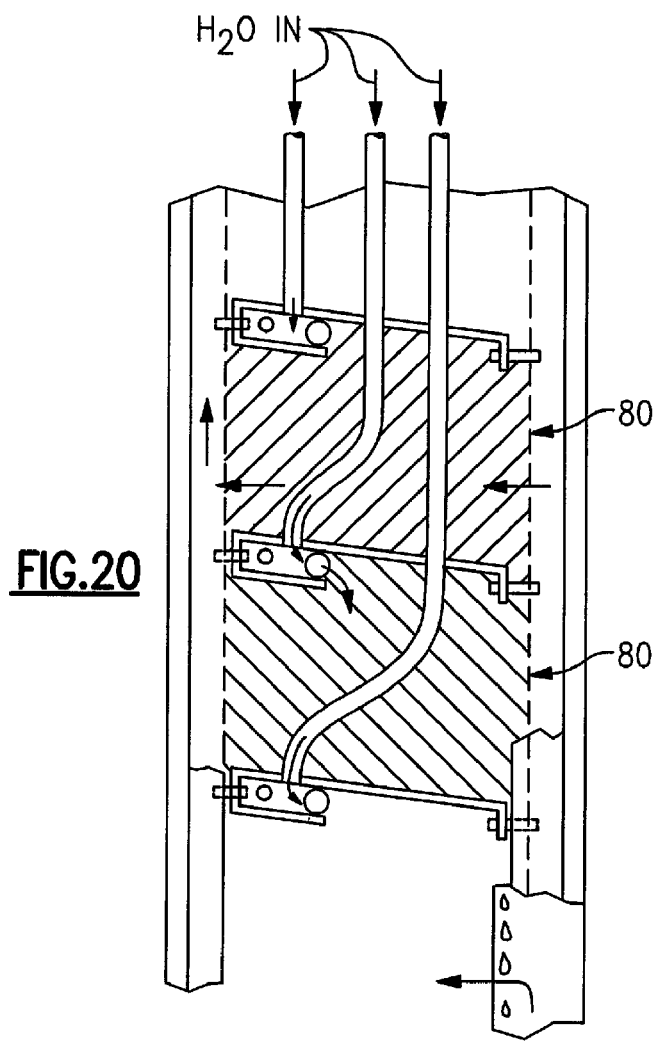
FIG. 20 is a side sectional view illustrating the water flow path for a plurality of rectangular cells.

FIG. 20 is a sectional schematic view illustrating a plurality of stacked cells 80 and the water and air flow paths respectively for each cell.

Figure 21:
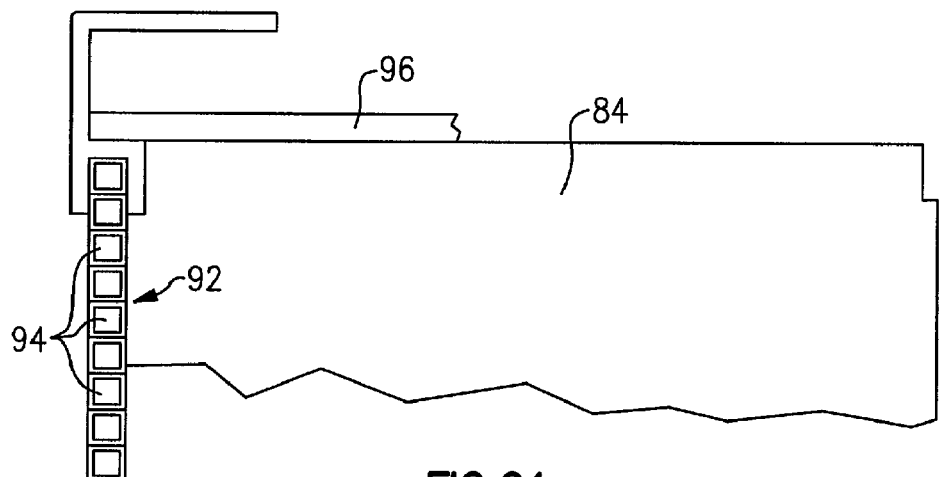
FIG. 21 is a partial sectional top view illustrating the air manifold passages and associated end cap for a rectangular cartridge.

FIG. 21 shows a top sectional view of the end cap 96 and the hollow wall section 92 having a plurality of microchannels 94.

Figure 22:
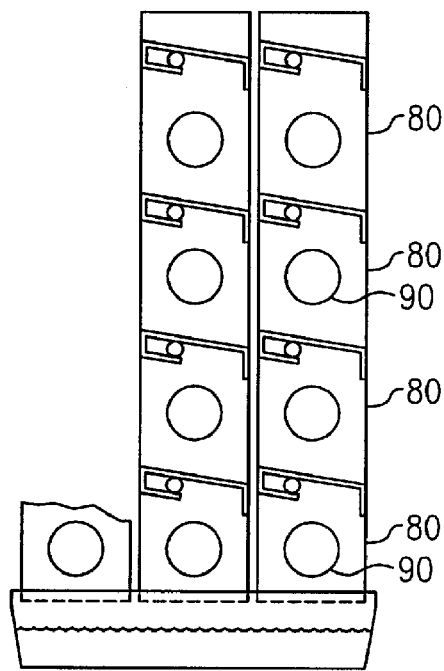
FIG. 22 is a side schematic view of a plurality of stacked bays each having a plurality of cells.

FIG. 22 is a schematic side view showing an arrangement of multiple bays, each having multiple cells 80.

The following is a summary of the operation of the three embodiments of the invention described above.

The following description applies to both the circular removable cartridge embodiment and the rectangular multi-cell variant, in that they both share the same or corresponding configuration variations and principles of operation. In operation (see FIGS. 4-7) the gas (air) to be treated (see arrows) is drawn into the system by a fan and travels through an intake manifold where it can be introduced into the media, contained in mesh cartridge(s) or within cell volume(s) formed by the inside walls of the manifolds, by means of slots or holes in the inside wall of the intake manifold, or optionally through slots or holes in the dividing shelves or walls located at right angles to the intake manifold. The gas then flows through the entire media volume across to the opposing exit slots or holes associated with an exhaust manifold, and then out of the system.

The media is periodically flushed or continually washed with a microbe laden water supply stored in a reservoir by means of a liquid pump feeding the liquid to distribution means located on top of the media and preferably fastened to an upper horizontal shelf or wall section. A lower opposed horizontal shelf or wall section then accumulates the excess drained liquid and transfers it through opening(s) into an adjacent vertical wall or manifold section for subsequent delivery down to the reservoir.

In the horizontal panel embodiment (See FIGS. 15-17) the gas (air) to be treated (see arrows) is drawn into the system by a fan and travels through a lower intake manifold formed by the reservoir and introduced into the media contained in a mesh cartridge by means of slots or holes in a lower horizontal shelf. The gas then flows through the entire media volume between dividing walls upward to the exit slots or holes located in the watering shelf into an exhaust manifold and then out of the system.

The media is periodically flushed or continually washed with a microbe laden water supply stored in the reservoir by means of a liquid pump feeding the liquid to distribution means located on top of the media fastened to the upper horizontal shelf. A lower opposed horizontal shelf section then accumulates the excess drained liquid and transfers it through opening(s) into the reservoir.

FIG. 16 illustrates the relationship of multiple cartridges, airflow, reservoir, vertical dividing walls with one dividing wall partially removed, horizontal watering shelves, enclosing side and end panels, and top cover.

In the embodiment in which rectangular cells are arranged in a vertical bay (see FIGS. 18A-21) the gas (air) to be treated (see arrows) is drawn into the system by a fan and travels through an intake manifold to a reservoir where it can be introduced into the media contained within cell volumes formed by the inside walls of the manifolds through slots or holes in a lower horizontal shelf. In series flow, as illustrated in FIG. 18A the gas then flows upward through the lower media cell and then through slots in a watering shelf into an upper media cell and then upward again through the upper media cell to the opposing exit slots or holes in an upper watering shelf into an exhaust manifold, and then out of the system.

The media is periodically flushed or continually washed with a microbe laden water supply stored in a reservoir by means of a liquid pump feeding the liquid to a distribution means located on top of the media and fastened to an upper horizontal watering shelf. A lower opposed horizontal shelf then accumulates the excess drained liquid and transfers it through opening(s) into an adjacent vertical wall manifold section for subsequent delivery down to the reservoir.

In parallel flow as illustrated in FIG. 18B, the gas to be treated is drawn into the system by a fan and travels through an intake manifold and introduced into the media, contained within multiple cell volumes formed by the inside walls of the manifold walls, by means of slots or holes in the inside wall of the intake manifold. The gas then flows diagonally upward and across the media volume into opposing exit slots or holes on the inner face of an exhaust manifold wall section, and then upward and out of the system.

The media is periodically flushed or continually washed with a microbe laden water supply stored in a reservoir by means of a liquid pump feeding the liquid to distribution means located on top of the media fastened to upper horizontal watering shelf sections. A lower opposed horizontal watering shelf then accumulates the excess drained liquid from the cell and transfers it through opening(s) into an adjacent vertical wall manifold section for subsequent delivery down to the reservoir.

FIG. 19A illustrates the relationship of cells, airflow, vertical hollow sidewall manifolds, horizontal watering shelves, water delivery plumbing, end panels, and media loading port while FIG. 19B illustrates the relationship of hollow side panels, end walls, reservoir, and top cover.

FIG. 20 illustrates relationship of multiple cells, airflow, water flow, water plumbing, and water flow, and FIG. 21 illustrates a typical hollow sidewall, end wall, and configuration of slot used for air and water entry and exit in the hollow wall.

FIG. 22 illustrates a configuration of multiple individually removable bays on a common reservoir forming a large cubic format biofilter maintaining the performance advantages of the small rectangular media cell and bay described above.

The media may consist of absorbent particles such as vermiculite for the periodically moisturized and flushed variant, or solid non-absorbent particles such as plastic or ceramic having a high surface area for the continually washed (biotrickling) variant.

The following example illustrates one typical embodiment of the invention. A cylindrical cartridge of the type illustrated in FIGS. 1 and 2 of the drawings was filled with 1.1 cubic foot of vermiculite, the ends sealed, and inserted in the housing.

System parameters are adjusted to achieve a 1.3 CFM airflow giving a nominal 45 second empty bed dwell time.

The system was then loaded with 2 gallons of inoculate and nutrient mixed in liquid. The inoculate used was Pseudomonas Putida which is capable of growth on toluene and is grown on a dilute minimal medium using styrene as a sole carbon and energy source. The inoculate is used in a concentration of about 1 0.sup.8 CFUIm1 and introduced to the cartridge by trickling over the vermiculite. The nutrient used was a common powdered garden fertilizer sold by Home Depot and Agway under the trade name Miracle Grow.

A standard styrene source which releases a nominal 100 PPM styrene at 1.3 CFM was connected to the inlet port, and the system blower and pump were started up. Measurements were taken with a photo-ionization detector (PID) at the inlet and outlet of the system. After a 48 hour acclimation period the styrene concentration in the outlet had dropped to under 8 PPM for a 92% reduction.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A bioremediation system comprising multiple vertically stacked cells formed by common side walls and multiple upper and lower shelves and end walls forming a multi-cell enclosed bay for containing media suitable for sustaining microbial activity, and further having one or more hollow cell side walls so configured as to allow vertical passage of a gas and/or liquid within the wall with said hollow cell side walls further having interior openings permitting liquid and/or gas flow in and out of the media contained within the multiple cells and further having multiple top and bottom shelves with said top shelves having water distribution means above each enclosed cell volume and said lower shelves having water collection means below each enclosed cell volume.

2. The system of claim 1 further including an air moving means to cause a gaseous flow through said hollow walls and system.

3. The system of claim 1 further including a reservoir and pumping means to transfer liquid through said system.

4. The system of claim 1 further having upper and lower open ends of said hollow cell side walls co-operatively connected to air moving means and reservoir means as required to form continuous gas and liquid flow paths.

* * * * *